US008954625B2

(12) United States Patent
Friedman

(10) Patent No.: US 8,954,625 B2
(45) Date of Patent: Feb. 10, 2015

(54) SYSTEM, METHOD AND COMPUTER PROGRAM PRODUCT FOR PORTABLE MULTIMEDIA CONTENT DISPLAY

(76) Inventor: Lee Friedman, Alpharetta, GA (US)

( * ) Notice: Subject to any disclaimer, the term of this patent is extended or adjusted under 35 U.S.C. 154(b) by 40 days.

(21) Appl. No.: 12/691,333

(22) Filed: Jan. 21, 2010

(65) Prior Publication Data

US 2011/0179196 A1    Jul. 21, 2011

(51) Int. Cl.
  *G06F 3/00*       (2006.01)
  *H04N 21/418*     (2011.01)
  *G06F 13/28*      (2006.01)
  *H04N 21/432*     (2011.01)
  *H04N 21/4402*    (2011.01)
  *G06F 17/30*      (2006.01)

(52) U.S. Cl.
  CPC ............ *H04N 21/4184* (2013.01); *G06F 13/28* (2013.01); *H04N 21/4325* (2013.01); *H04N 21/440218* (2013.01); *G06F 17/30247* (2013.01)
  USPC .............................................. 710/15; 710/22

(58) Field of Classification Search
  CPC ...................................................... G06F 13/28
  USPC .......................................................... 710/15
  See application file for complete search history.

(56) References Cited

U.S. PATENT DOCUMENTS

| | | | |
|---|---|---|---|
| 2002/0180803 A1* | 12/2002 | Kaplan et al. .................. | 345/810 |
| 2004/0168118 A1* | 8/2004 | Wong et al. ................. | 715/500.1 |
| 2004/0186723 A1* | 9/2004 | Mizutani et al. ........... | 704/270.1 |
| 2006/0059097 A1* | 3/2006 | Kent ................................ | 705/57 |
| 2006/0230038 A1* | 10/2006 | Silverman et al. ................ | 707/6 |
| 2008/0002951 A1 | 1/2008 | Russ | |
| 2008/0021777 A1* | 1/2008 | Mack et al. ..................... | 705/14 |
| 2008/0080836 A1 | 4/2008 | Hutten | |
| 2008/0082688 A1* | 4/2008 | Yi et al. ......................... | 709/246 |
| 2008/0137865 A1* | 6/2008 | Sabet-Sharghi et al. ....... | 380/277 |
| 2008/0226260 A1* | 9/2008 | Yang et al. ...................... | 386/95 |
| 2009/0022129 A1* | 1/2009 | Karaoguz et al. ............. | 370/338 |
| 2009/0062949 A1* | 3/2009 | Heo et al. ......................... | 700/94 |
| 2009/0147840 A1* | 6/2009 | Sahdra et al. ............ | 375/240.01 |
| 2009/0157802 A1* | 6/2009 | Kang et al. .................... | 709/203 |
| 2009/0172129 A1* | 7/2009 | Singh et al. ................... | 709/217 |
| 2012/0108293 A1* | 5/2012 | Law et al. ...................... | 455/557 |

* cited by examiner

*Primary Examiner* — Henry Tsai
*Assistant Examiner* — John Roche
(74) *Attorney, Agent, or Firm* — G. Michael Roebuck, PC

(57) ABSTRACT

A system, method and computer program product for performing a method for presenting multimedia data are disclosed. The method includes but is not limited to detecting insertion of a portable storage device into a first end user device; automatically launching transfer of multimedia data and Meta data describing the multimedia data from the first end user device to the portable storage device; transferring the multimedia data from the first end user device to the portable storage device; detecting insertion of the portable storage device into a second end user device; automatically launching transfer of multimedia data and Meta data describing the multimedia data from the portable storage device to the second end user device; and transferring the multimedia data from the portable storage device to the second end user device.

15 Claims, 3 Drawing Sheets

SYSTEM, METHOD AND COMPUTER PROGRAM PRODUCT FOR PORTABLE MULTIMEDIA CONTENT DISPLAY

FIELD OF THE DISCLOSURE

The present disclosure relates to the presentation of multimedia data.

BACKGROUND OF THE DISCLOSURE

In general, the technologies for storing and reproducing the multimedia content data have significantly improved with the industry advances in consumer electronics. In a broad sense, multimedia data can be classified as audio, video, and image content. Typical storage devices for multimedia content include: cassette tape, video tape, compact disc (CD), digital video disc (DVD), memory, hard disk, and portable storage devices. In order to reproduce the multimedia contents the following representative devices are used: cassette tape player, video cassette recorder (VCR), CD player (portable/non-portable), DVD player (portable/non-portable), computer (desktop, laptop, PDA, pocket PC, etc), and MP3 player. The technologies for high-density memory and hard disc have made it possible for portable storage devices to be advanced such that they are able to store the multimedia contents from several hundred Megabytes (M bytes) to several hundred Gigabytes (G bytes)

Currently, most users can obtain multimedia contents by purchasing cassette tape, video tape, CD, or DVD. However, the trend of obtaining the multimedia contents is rapidly shifting due to the advance of wireline and wireless Internet-based technologies and the explosive growth of Internet users. In order to distribute and obtain the multimedia data through the network, the multimedia contents should be stored and distributed in digital formats. Since the conversion of the multimedia contents to digital formats and distribution through the network require a huge memory space and network resources, data compression technologies depending on the contents have been advanced to remove redundant information present in the contents. For instance, MPEG Audio Layer-3 (MP3) is used, in general, to compress audio contents (music, FM broadcast etc) and JPEG is used to compress images. For the compression of video, different methods are used. MPEG-2 or MPEG-4 is used for digital TV broadcasting and AVI (Audio Video Interactive) is used for video on the Windows system.

Since the multimedia contents in cassette tape, video tape, CD, and DVD are selected by the content provider, a user does not have much freedom to choose the contents of his/her preference and much of the contents are wasteful. Furthermore, in order to reproduce the contents, a user should carry a volume of materials that contain the contents. When the portable storage device is used, it has an advantage of portability due to a compact size. However, it has major drawbacks in that a computer should be used when downloading the contents to the storage device and the contents cannot be regenerated through the consumer electronic devices because they do not have-the capability to accept the contents in the storage device.

DETAILED DESCRIPTION

Figure 1:
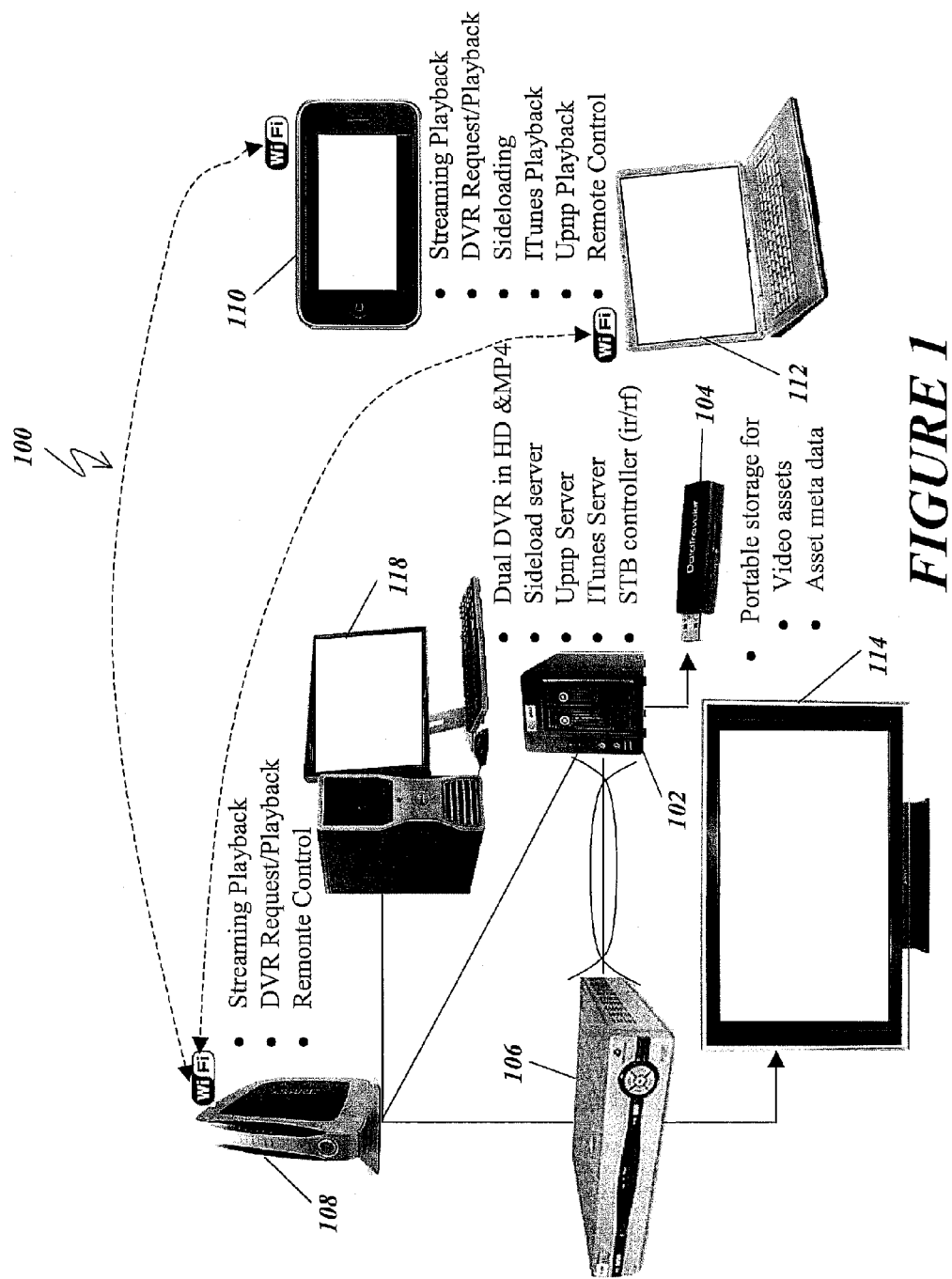
FIG. 1 depicts an illustrative embodiment of a system for multimedia content display.

Digital video recorders (DVRs) exist today to provide standard density (SD) or high density (HD) quality multimedia data including but not limited to data such as video, audio and imagery data for use in the home on an end user device. The time to transcode and transfer the multimedia data may not be available to the user. An illustrative embodiment enables a user to transfer the content on from an end user device such as a DVR to a portable storage device for use in a remote or off line situation (i.e. a cruise, plane, or somewhere with no network connectivity) on another end user device. An illustrative embodiment provides the portable storage device and auto start functionality on the device to download record multimedia data directly from an end user device to the portable storage device; the ability to maintain a file of the associated Meta data for describing the multimedia data on the portable storage device with program details of the assets; the ability to play the asset using standard players on a laptop, net book or other device capable of reading the portable storage device; and the ability to contain a automatic start up self running menu of the multimedia and Meta data and a standalone software program on the portable storage device that uses the multimedia data and Meta data on the portable storage device.

An illustrative embodiment provides a system, method and computer program product that executes functions to record the multimedia data and associated Meta data from the end user device. The multimedia data and associated Meta data have program information for easy user interaction. The multimedia data and associated Meta data are targeted for device delivery. The multimedia data and associated Meta data are stored on the portable storage device for transfer and presentation on another end user device. Multimedia presentation includes but is not limited to reproducing audio data on a sound reproduction device and displaying video and image on a display device. Each multimedia data and associated Meta data is stored with an associated Meta data file that describes the multimedia data. The Meta data provides additional information for presenting program description and program selection information including but not limited to file name, channel number, channel identifier, start time, duration, show name, episode title and description: The multimedia data files are named explicitly in file names and the Metadata holds the file names as pointers to the multimedia files when a user or function selects any one of the multimedia data files by file name.

In a particular illustrative embodiment of the present invention, the portable storage device includes a combination of hardware and software which facilitates the input of the multimedia data from external sources such as various end user devices, into the portable storage device, output the multimedia data from the portable storage device to external multimedia equipment, and navigate and manage the multimedia data and Meta data stored on the portable storage device. Selected multimedia content can be downloaded onto the portable storage device from any one of many multimedia data sources, such as the content stored on hard disks of PCs/laptops, content stored on the Internet, digital broadcast content, digital video recorders (DVRs), and other sources. Accordingly, the stored content on the portable storage device can be uploaded and played on at least one of the variety of multimedia end user devices, including DVRs, the hard disks of laptops and personal digital assistants (PDA), mobile communication terminals, digital television, a personal screen in an airplane, and car audio systems.

In a particular illustrative embodiment, the transfer of the selected multimedia content into and out of the portable storage device is via a USB port. While the transfer of multimedia content into and out of the portable storage device may take place via a variety of external interfaces, some typical interfaces and their associated drivers for interfacing with the portable storage device may include the USB, Fire wire (IEEE1394), Bluetooth, WiMax, UWB and WiFi.

In another particular illustrative embodiment, the portable storage device memory further includes data indicating a Drivers/Interfaces map. In another illustrative embodiment, the major drivers/interfaces components include the interfaces for content transfer (USB, WiFi, Firewire, and Bluetooth), the interfaces for the keypad buttons and for the display, a battery and associated circuitry for the power management unit, an audio compression/decompression (codec) unit, a video codec unit, and a memory module. In another illustrative embodiment, the codec may be implemented as a system-on-chip (SOC).

In another illustrative embodiment, the portable storage device further includes but is not limited to an Audio/Video Transcoder unit on the portable storage device. In another particular embodiment, the Audio/Video Transcoder unit is located on the end user device to which the data is being transferred. The portable storage device's computer readable medium further includes but is not limited to the drivers for the various content transfer interfaces, i.e., USB, Firewire, WiFi, WiMax, and Bluetooth, the driver for the portable storage device display, the keypad driver, software for control of the user navigation and management of the stored content, the device profiles, and the transcoder unit. The device profiles portion contains external device capabilities which could be used in customizing the multimedia data to suit the end user device. For example, the device profile could be the bit rate handled by an end user device or the resolution of the end user device to or from which multimedia data and Meta data are transferred.

The portable storage device provides the ability to process a variety of multimedia formats due to the transcoder, an audio transcoder and a video transcoder, which manage decoding/encoding and converting between different multimedia data formats. One of the functions of the transcoder is to convert the multimedia data format received by the portable storage device into the multimedia data format for the multimedia equipment device to which it is supposed to connect and deliver the content. Some of the various audio multimedia data formats processed by the audio Transcoder include but are not limited to MP3, WMA (windows media audio), CD-DA (compact disk—digital audio, the format used in audio CD), AAC (advanced audio coding), and real audio. The video multimedia formats processed by the video Transcoder include the MPEG, AVI (audio visual interactive), and real video.

Turning now to FIG. 1, as shown in FIG. 1, in a particular illustrative embodiment a digital video recorder (DVR) 102 and set top box (STB) 106 receive digital multimedia data and Meta from a wireless fidelity (WiFi) transceiver 108. The digital multimedia data comprises content such as movies, television programs and music. The Meta data describes the multimedia data. The multimedia data includes but is not limited to audio, video, text and image data. The multimedia data is distributed from the WiFi transceiver to a WiFi portable device 110 (such as an iPhone) or laptop computer 112. The STB sends multimedia data for display to the television screen 114. A portable storage device 104 is provided for storing the multimedia data and Meta data describing the multimedia data. The portable storage device is provided with a processor and computer readable media memory for storing executable computer instructions and data including but not limited to the multimedia content and Meta data describing the multimedia data. The portable storage device further includes but is not limited to a computer program of computer executable instructions that when executed by a computer automatically launch to down load and store the multimedia content and Meta data describing the multimedia data from an end user device. The portable storage device further includes but is not limited to a computer program of computer executable instructions that when executed by a computer automatically launch to transfer and display the multimedia content and Meta data describing the multimedia data to an end user device. The computer program and method steps are performed by the computer program product. The portable storage device further includes but is not limited to a processor and computer readable medium memory.

Figure 2:
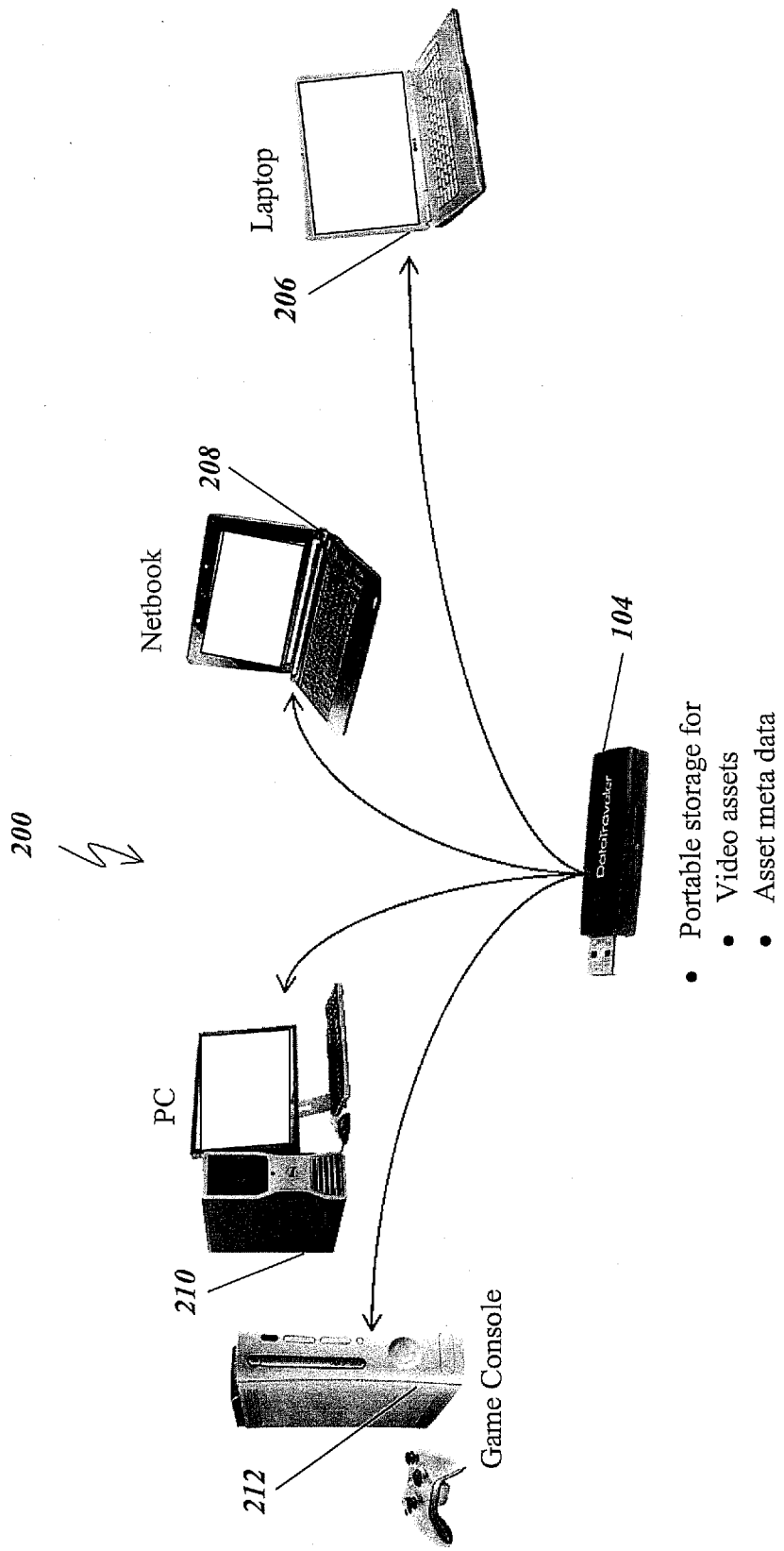
FIG. 2 depicts an illustrative embodiment of a system for multimedia content display.

Turning now to FIG. 2, as shown in FIG. 2, in an illustrative embodiment the portable storage device 104 including the computer program product embodied in the computer readable medium of the portable storage device launch a self-starting display of contents and Meta data when connected to an external display device such as a game console 212, personal computer 210, net book 208 or lap top computer 206. In a particular illustrative embodiment, the computer program product launches the computer program to perform one or more of the methods described herein when the computer program product detects that it has been inserted into an end user device.

In a particular illustrative embodiment, the multimedia data is downloaded from an end user device and stored in the same multimedia data format from which the multimedia data is transferred in order to reduce the time it takes to transfer the multimedia data and Meta data from the transferring device to the portable storage device. In a particular illustrative embodiment, the Meta data are stored in an XML file or other suitable format. The multimedia data are stored separately on the portable storage device. Once the multimedia data and Meta data have been transferred from a first end user device in a first location to the portable storage device, the portable storage device can be removed and inserted into a second end user device in a second location. The multimedia data and Meta data are then automatically displayed on the second end user device.

In another particular illustrative embodiment, the computer program product stored on the portable storage device launches a contents display program on the second end user device when computer program product detects that the portable storage device has been inserted into the second end user device. In another particular embodiment, the computer program product launches a multimedia display program that automatically presents the multimedia data on the end user device upon detecting insertion of the portable storage device into the end user device.

Figure 3:
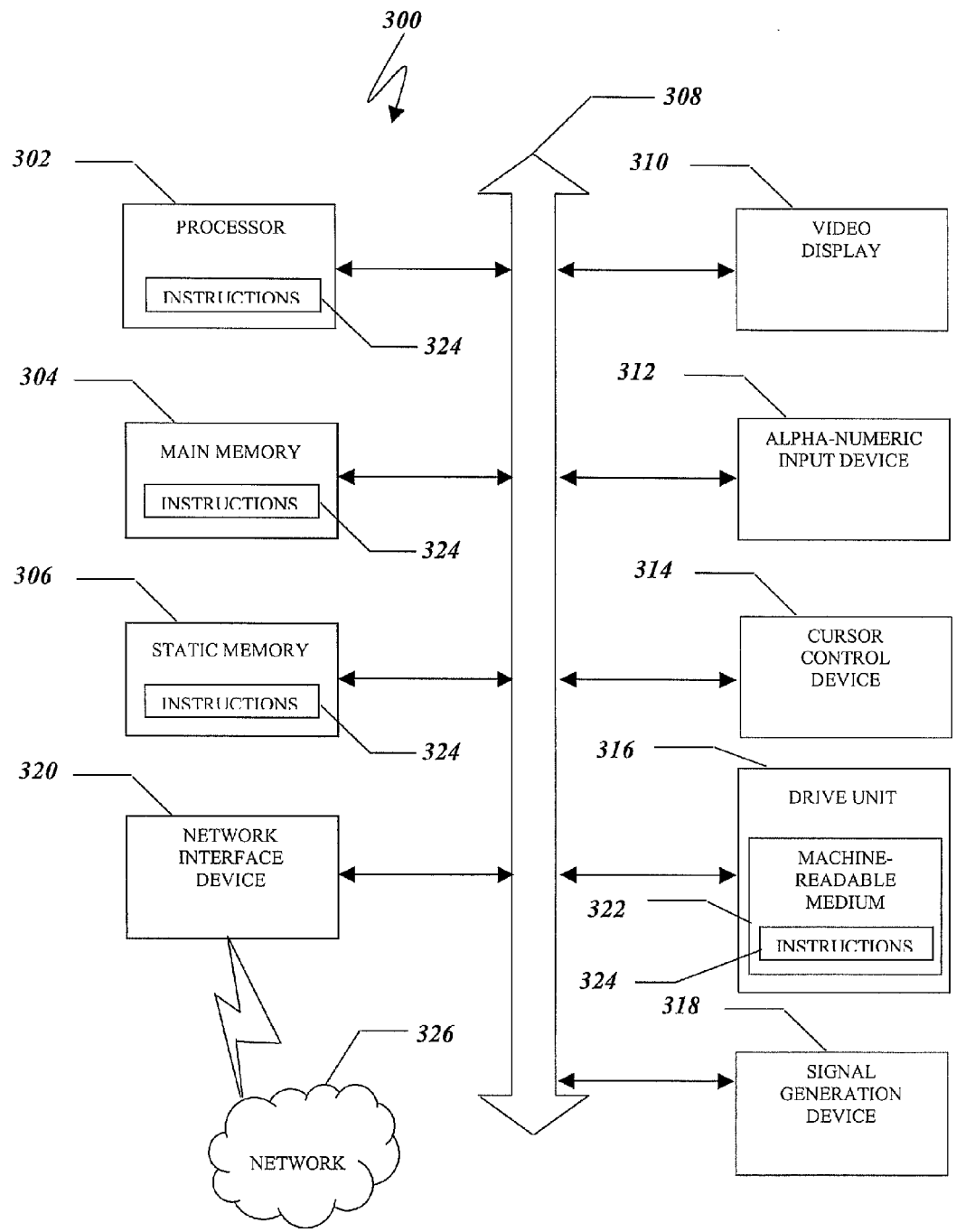
FIG. 3 depicts an illustrative embodiment of a machine for performing functions disclosed in an illustrative embodiment.

FIG. 3 is a diagrammatic representation of a machine in the form of a computer system 300 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed)

network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU), or both), a main memory 304 and a static memory 306, which communicate with each other via a bus 308. The computer system 300 may further include a video display unit 310 (e.g., liquid crystals display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface.

The disk drive unit 316 may include a machine-readable medium 322 on which is stored one or more sets of instructions (e.g., software 324) embodying any one or more of the methodologies or functions described herein, including those methods illustrated in herein above. The instructions 324 may also reside, completely or at least partially, within the main memory 304, the static memory 306, and/or within the processor 302 during execution thereof by the computer system 300. The main memory 304 and the processor 302 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320. The machine readable medium may also contain a data structure for containing data useful in providing a functional relationship between the data and a machine or computer in an illustrative embodiment of the disclosed system and method.

While the machine-readable medium 322 is shown in an example embodiment to be a single tangible medium, the term "machine-readable medium" should be taken to include a single medium or multiple tangible media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for presenting multimedia data, the method comprising:
   detecting at a portable storage device processor in a portable storage device, insertion of the portable storage device into a first end user device;
   upon the detecting, automatically launching and downloading at the portable storage device processor multimedia data and Meta data from a first non-transitory tangible computer readable medium on the first end user device to a second non-transitory tangible computer readable medium on the portable storage device after the detecting of the insertion;
   automatically, launching, transferring and displaying of the Meta data describing the multimedia data at the portable storage device processor upon detecting the insertion and without a request from an end user at the end user device;
   detecting at the portable storage device processor, insertion of the portable storage device into a second end user device;
   upon detecting the insertion and without a request from an end user at the second end user device, automatically, at the portable storage device processor, launching a transfer of multimedia data and Meta data describing the multimedia data from the second non-transitory computer readable medium on the portable storage device to the second end user device;
   upon detecting the insertion and without a request from an end user at the second end user device, automatically, at the portable storage device processor, transferring the multimedia data from the second non-transitory tangible computer readable medium on the portable storage device to a third non-transitory tangible computer readable medium on the second end user device; and
   upon detecting the insertion and without a request from an end user at the second end user device, automatically, at the portable storage device processor, launching a contents display program on the second end user device.

2. The method of claim 1, the method further comprising:
   automatically detecting at the portable storage device processor, a second multimedia data format compatible with the second end user device; and
   automatically transcoding at the portable storage device processor, the multimedia data from a first multimedia data format to the second multimedia data format compatible with the second end user device.

3. The method of claim 2, the method further comprising:
   automatically transcoding at the portable storage device processor, the Meta data describing the multimedia data from the first multimedia data format compatible with the first end user device to a the multimedia data format compatible with the second end user device.

4. The method of claim 1, the method further comprising:
   automatically launching at the portable storage device processor a user interface menu on the first end user device; and
   accepting at the portable storage device processor, a user input from the user interface menu on the first end user device, wherein the user input determines which multimedia data will be transferred to the portable storage device.

5. The method of claim 1, the method further comprising:
   accepting at the portable storage device processor, a user input from the second end user device, wherein the user input determines which multimedia data will be transferred from the portable storage device.

6. A non-transitory computer readable medium, the computer readable medium containing a computer program for presenting multimedia data comprising computer executable instructions that when executed by the portable storage device processor performs the computer program, the computer program comprising:
   instructions to detect at the portable storage device processor in a portable storage device, insertion of the portable storage device into a first end user device;
   instructions to, upon detecting the insertion and without a request from an end user at the first end user device, automatically launch at the portable storage device processor, a transfer of multimedia data and Meta data describing the multimedia data from the first end user device to the portable storage device upon the detection of the insertion;
   instructions to automatically launch at the portable storage device processor, transfer and display of Meta data describing the multimedia data;
   instructions to transfer at the portable storage device processor, the multimedia data from a first tangible computer readable medium on the first end user device to a second tangible computer readable medium on the portable storage device;
   instructions to detect at the portable storage device processor, insertion of the portable storage device into a second end user device;
   instructions to, upon detecting the insertion and without a request from an end user at the second end user device, automatically launch at the portable storage device processor, a transfer of multimedia data and Meta data describing the multimedia data from the portable storage device to the second end user device, upon the detection of the insertion into the second end user device;
   instructions to, upon detecting the insertion and without a request from an end user at the second end user device, automatically, at the portable storage device processor, transfer at the portable storage device processor, the multimedia data from the second non-transitory tangible computer readable medium on the portable storage device to a third non-transitory tangible computer readable medium on the second end user device and
   instructions to upon detecting the insertion and without a request from an end user at the second end user device, automatically, at the portable storage device processor, launch a contents display program on the second end user device.

7. The system of claim 6, the computer program further comprising:
instructions to detect at the portable storage device processor a format compatible with the second end user device;
and instructions to automatically transcode the multimedia data from a first format to the format compatible with the second end user device.

8. The system of claim 6, the computer program further comprising:
instructions to automatically transcode at the portable storage device processor the Meta data describing the multimedia data from a first format to the format compatible with the second end user device.

9. The system of claim 6, the computer program further comprising:
instructions to automatically launch at the portable storage device processor a user input menu on the first end user device; and
instructions to accept at the portable storage device processor, a user input from the user input menu on the first end user device, wherein the user input determines which multimedia data will be transferred to the portable storage device.

10. The system of claim 6, the computer program further comprising:
instructions to accept at the portable storage device processor, a user input from the second end user device, wherein the user input determines which multimedia data will be transferred from the portable storage device.

11. A system for presenting multimedia data, the system comprising:
a portable storage device processor; and
a non-transitory tangible computer readable medium, the computer readable medium containing a computer program for presenting multimedia data comprising computer executable instructions that when executed by the processor perform the computer program, the computer program further comprising:
instructions to detect at the portable storage device processor, insertion of a portable storage device into a first end user device;
instructions to upon detection of the insertion of portable storage device into the first end user device and without an input from an end user at the first end user device, instructions to automatically launch at the portable storage device processor, a transfer of multimedia data and Meta data describing the multimedia data from the first end user device to the portable storage device upon the detection of the insertion into the first end user device;
instructions to automatically launch at the portable storage device processor, a transfer and display of Meta data describing the multimedia data on the portable storage device;
instructions to transfer the multimedia data from a first non-transitory tangible computer readable medium on the first end user device to a second non-transitory tangible computer readable medium on the portable storage device;
instructions to detect insertion of the portable storage device at the portable storage device processor, into a second end user device;
instructions to, upon detecting the insertion, automatically launch at the portable storage device processor, a transfer of multimedia data and Meta data describing the multimedia data from the portable storage device to the second end user device upon the detecting into the second end user device;
instructions to upon detecting the insertion and without a request from an end user at the second end user device, automatically, at the portable storage device processor, transfer at the portable storage device processor, the multimedia data from the second non-transitory tangible computer readable medium on the portable storage device to a third non-transitory tangible computer readable medium on the second end user device and
instructions to upon detecting the insertion and without a request from an end user at the second end user device, automatically, at the portable storage device processor, launch a contents display program on the second end user device.

12. The system of claim 11, the computer program further comprising:
instructions to detect at the portable storage device processor, a format compatible with the second end user device;
and instructions to automatically transcode at the portable storage device processor, the multimedia data from a first format to the format compatible with the second end user device.

13. The system of claim 11, the computer program further comprising:
instructions to automatically transcode at the portable storage device processor, the Meta data describing the multimedia data from a first format to the format compatible with the second end user device upon the detection into the second end user device.

14. The system of claim 11, the computer program further comprising:
instructions to automatically launch at the portable storage device processor, a user input menu on the first end user device; and
instructions to accept a user input from the user input menu on the first end user device, wherein the user input determines which multimedia data will be transferred to the portable storage device.

15. The system of claim 11, the computer program further comprising:
instructions to accept at the portable storage device processor, a user input from the second end user device, wherein the user input determines which multimedia data will be transferred from the portable storage device.

* * * * *